US009532030B2

(12) United States Patent
Kolar et al.

(10) Patent No.: US 9,532,030 B2
(45) Date of Patent: Dec. 27, 2016

(54) INTEGRATED THREE-DIMENSIONAL VISION SENSOR (71) Applicant: COMMISSARIAT A L'ENERGIE ATOMIQUE ET AUX ENERGIES ALTERNATIVES, Paris (FR)

(72) Inventors: Anthony Kolar, Paris (FR); Marc Duranton, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 318 days.

(21) Appl. No.: 14/367,911

(22) PCT Filed: Dec. 13, 2012

(86) PCT No.: PCT/EP2012/075446
§ 371 (c)(1),
(2) Date: Jun. 21, 2014

(87) PCT Pub. No.: WO2013/092396
PCT Pub. Date: Jun. 27, 2013

(65) Prior Publication Data
US 2014/0354778 A1 Dec. 4, 2014

(30) Foreign Application Priority Data
Dec. 22, 2011 (FR) .................................. 11 62308

(51) Int. Cl.
*H04N 13/02* (2006.01)
*H04N 15/00* (2006.01)
(Continued)

(52) U.S. Cl.
CPC ............ *H04N 13/0235* (2013.01); *G06T 1/20* (2013.01); *H04N 5/2254* (2013.01); *H04N 5/3454* (2013.01)

(58) Field of Classification Search
CPC ........................ H04N 13/0239; H04N 13/0055
See application file for complete search history.

(56) References Cited

U.S. PATENT DOCUMENTS

| 5,926,411 A * | 7/1999 | Russell .................. G11C 7/005 365/106 |
| 8,363,093 B2 * | 1/2013 | Wang ................. H04N 13/0214 348/336 |

(Continued)

FOREIGN PATENT DOCUMENTS

WO 2010035173 A1 4/2010

OTHER PUBLICATIONS

N. Joshi et al., "Synthetic Aperture Tracking: Tracking through Occlusions", Computer Visions, Oct. 2007, IEEE 11th International Conference, 8 pages.

(Continued)

*Primary Examiner* — Chikaodili E Anyikire
(74) *Attorney, Agent, or Firm* — Baker & Hostetler LLP (57) ABSTRACT

A three-dimensional scene sensor comprises: a deformable optical system modifying focal distance by control signal, optics imaging the scene by analog image sensor for depths corresponding to distances; the image sensor comprising a matrix of pixels grouped into sub-matrices of macro-pixels being a sub-assembly of pixels, each macro-pixel operating independently for acquisition and reading of data; a matrix of elementary processors, each macro-pixel directly connected to a dedicated processor wherein pixel data for the macro-pixel are transmitted and processed by the processor, each processor carries out, for each pixel, local processing operations calculating depth information for macro-pixel, the processors operating in parallel and independently such that the depth information is processed and calculated in parallel over all macro-pixels of the image sensor, the processors connected to at least one processing unit allowing (Continued)

calculations using high-level input data, calculated starting from the pixel data directly produced by the image sensor.

17 Claims, 4 Drawing Sheets

(51) Int. Cl.
*G06T 1/20* (2006.01)
*H04N 5/345* (2011.01)
*H04N 5/225* (2006.01)

(56) References Cited

U.S. PATENT DOCUMENTS

| | | | | |
|---|---|---|---|---|
| 2002/0050518 A1* | 5/2002 | Roustaei | ............ | G06K 7/10544 235/454 |
| 2002/0071104 A1* | 6/2002 | Silverbrook | ............... | B41J 2/14 355/18 |
| 2002/0191831 A1* | 12/2002 | Spoto | ..................... | G01N 21/88 382/141 |
| 2009/0167923 A1* | 7/2009 | Safaee-Rad | ........... | G06T 7/0069 348/345 |
| 2010/0289941 A1* | 11/2010 | Ito | .......................... | G02B 7/365 348/345 |

OTHER PUBLICATIONS

A. Yokota et al., "High-Speed Sensing System for Depth Estimation Based on Depth-From-Focus by Using Smart Imager", Circuits and Systems, 2005, vol. 1, IEEE International Symposium, pp. 564-567.
Amir Fijany, et al., "Image Processing Applications on a Low Power Highly Parallel SIMD Architecture", IEE Aerospace Conference, Mar. 5, 2011, pp. 1-12, IEEE, XP031938041.
Akos Kusnyerik, et al., "Vision Restoration and Vision Chip Technologies", Procedia Computer Science, May 6, 2011, pp. 121-124, vol. 7, Elsevier B.V., XP028348720.
Kohtaro Ohba, et al., "Real-Time Micro Environmental Observation with Virtual Reality", 15th International Conference on Patter Recognition, Sep. 3, 2000, pp. 487-490, vol. 4, IEEE Comput. Soc., Los Alamitos, CA, USA, XP010533124.

\* cited by examiner

INTEGRATED THREE-DIMENSIONAL VISION SENSOR

CROSS-REFERENCE TO RELATED APPLICATIONS

This application is a National Stage of International patent application PCT/EP2012/075446, filed on Dec. 13, 2012, which claims priority to foreign French patent application No. FR 1162308, filed on Dec. 22, 2011, the disclosures of which are incorporated by reference in their entirety.

FIELD OF THE INVENTION

The invention relates to three-dimensional scene sensors (known as 3D vision sensors) and in particular 3D vision sensors designed as onboard sensors.

PRIOR ART 3D vision systems are being developed in order to provide a spatial representation of scenes to onboard systems in numerous applications. By way of examples, the following may be mentioned:

Autonomous robotics requires 3D vision for shape recognition and topographical analysis. For example, domestic robotics is currently a growth area with the aim of providing various services to the user such as the surveillance of premises or of persons, facial recognition with a view to carrying out a certain action depending on the person, etc.

Microrobotics relates to the micro-robots used for recognition missions in confined environments such as industrial premises, caves, houses, etc.

A 3D representation can provide relevant information usable in the biomedical field and, more particularly, endoscopy, in order to aid the practitioner to recognize areas of interest such as polyps, and even to allow him/her to estimate its size.

The use as a driving aid, with as a priority the improvement in safety, offers numerous applications requiring 3D sensors: detection of objects (pedestrians or vehicles) with a view to predicting collisions; regulation of speed with respect to the preceding vehicle; determination of the size of the passengers for the adaptation of the airbags; detection and holding of heading, aid for changing lanes (monitoring of the blind spot).

The emergence of these new fields of application is causing the appearance of numerous constraints which represent as many barriers to the implementation of 3D vision systems. These systems or sensors must be highly integrated (size, weight) in order to be able to be carried onboard, communicating, have a low power consumption and a capacity for vision in real time while at the same time providing a high degree of precision.

There exist a certain number of devices which aim to meet the aforementioned needs.

One of the existing solutions is the sensor Swiss Ranger 3000 and 4000 produced by the company MESA Imaging. This is an application for 3D reconstruction by time of flight using a modulated source requiring miniaturization of the systems. This sensor allows the reconstruction of a scene with a centimeter-scale precision up to ten meters at a frame rate of fifty images per second. This system nevertheless comprises the following limitations:

The reconstruction distance, limited to around ten meters;

The electrical power consumption in the neighborhood of ten watts, which is incompatible with the desired high level integration;

The overall size of the system, 65*65*68 mm, rendering the use of this sensor impossible in the case of severe size constraints such as for micro-drones;

The use of an active method (energy-wave emission) renders the use of this product impossible when several identical sensors target the same scene: impossibility of defining with certainty the source of the wave. This point may be critical in the case, for example, of an automobile, in particular if the system is a link in the image processing chain aimed at predicting a collision.

Another existing solution is that developed by the company Videre Design, based on stereoscopic systems-on-a-chip. The method is based on the creation of a disparity map over several levels (the greater the disparity, the closer the object), but the precision depends directly on the size of the stereoscopic base (distance separating the two objective lenses) which in this case varies from nine to thirty centimeters, so a high-level integration is then impossible. Moreover, this method can only work by assuming that the scene has enough texture to determine a disparity, which is not the case in some application areas such as endoscopy.

Kinect from Microsoft developed by PrimeSense is based on an of active stereoscopic solution, in other words using a camera and a pattern projector in the near-infrared spectral range, and generates a depth map in order to allow a human interaction with the machine. In this way, this interaction takes place in all the spatial directions, thus providing an intuitive control of the applications. The main drawbacks of this device are its lack of precision and, above all, the overall latency of the system that can in some cases be detrimental to its correct use.

Phenoptical solutions, such as described for example in the document "*Synthetic Aperture Tracking: Tracking Through Occlusions*" by Joshi, N.; Avidan, S.; Matusik, W.; Kriegman, D. J.; Adobe Syst. Inc, San Diego, Computer Vision, 2007, enable both the reconstruction of the relief, with or without shadowing, and the focusing of the image at every point, during or after the acquisition of the image. The principle is based on the installation of a set of micro-lenses above the image sensor. Each of these lenses is characterized by a different focal length, so that each group of pixels associated with these lenses will focus at a given distance. This method then offers the possibility, on the one hand, of reconstructing a sharp image at every point, and on the other, of reconstructing the depth of the scene by reducing the system to a multi-sensors passive vision solution. This technology is used by the company Pelican Imaging (California), and is currently at the prototyping stage. The first demonstrators are not integratable due to their size, over a meter in width, and their power consumption. In addition, in the framework of a 3D reconstruction, the problem of the spacing between the lenses in an integrated version for mobile telephone for example, would limit the reconstruction distance to only a few tens of centimeters.

The University of Sciences in Tokyo describes in the document "*High-speed Sensing System for Depth Estimation Based on Depth-from-Focus by Using Smart Imager*", ISCAS 2005, July 2005, by Arimitsu Yokota, Takashi Yoshida, Hideki Kashiyama, and Takayuki Hamamoto, a vision system using an image sensor coupled to a set of optics with a variable focal length and based on a calculation method allowing a depth map to be obtained. However, the calculations and processing operations needed to obtain the depth map are carried out remotely, which allows no flexibility of the system and resulting in a low rate of depth map generation of around 30 depth maps per second, with an image sensor comprising a low number of pixels (64×64).

SUMMARY OF THE INVENTION

The aim of the invention is to overcome the aforementioned drawbacks by allowing a three-dimensional vision sensor to be produced that at the same time is very compact in volume and in weight, has a low power consumption, does not require any external image memory and allows depth information to be obtained in real time and at a high rate.

For this purpose, the subject of the invention is a three-dimensional scene sensor comprising:

deformable optical system allowing a modification of the focal distance as a function of a control signal, said optics imaging said scene on an analog image sensor for a plurality of depths corresponding to a plurality of values of focal distance, the analog image sensor carrying out one image acquisition for each value of focal distance, the images being analyzed in order to determine depth information, the analog image sensor comprising a matrix of pixels, the pixels being grouped into sub-matrices called macro-pixels composed of a sub-assembly of pixels, each macro-pixel operating independently of its neighbors for the acquisition and the reading of the data from the pixels for each portion of image, one portion of image being respectively associated with one macro-pixel, a matrix of elementary processors, each macro-pixel being directly connected via an interface to a dedicated elementary processor in such a manner that the pixel data relating to said pixels belonging to said macro-pixel are transmitted and processed by said processor, each of the processors comprising a local memory, a neighborhood manager and a plurality of local processing units in such a manner as to carry out, for each of the pixels of the macro-pixel to which the processor is connected and for each portion of image, local processing operations taking into account the neighboring pixels, the local processing operations allowing depth information to be calculated for said macro-pixel, the processors operating in parallel and independently of one another such that, for each image portion, the depth information is processed and calculated in parallel over all of the macro-pixels of said image sensor, each elementary processor being capable of modifying certain parameters of the image sensor corresponding to the associated macro-pixel, the processors being designed to be connected to at least one processing unit allowing calculations to be carried out using high-level input data, obtained starting from the depth information calculated by the elementary processors.

BRIEF DESCRIPTION OF THE DRAWINGS

Other features, aims and advantages of the present invention will become apparent upon reading the detailed description that follows and with regard to the appended drawings given by way of non limiting examples and in which.

DETAILED DESCRIPTION

Figure 1:
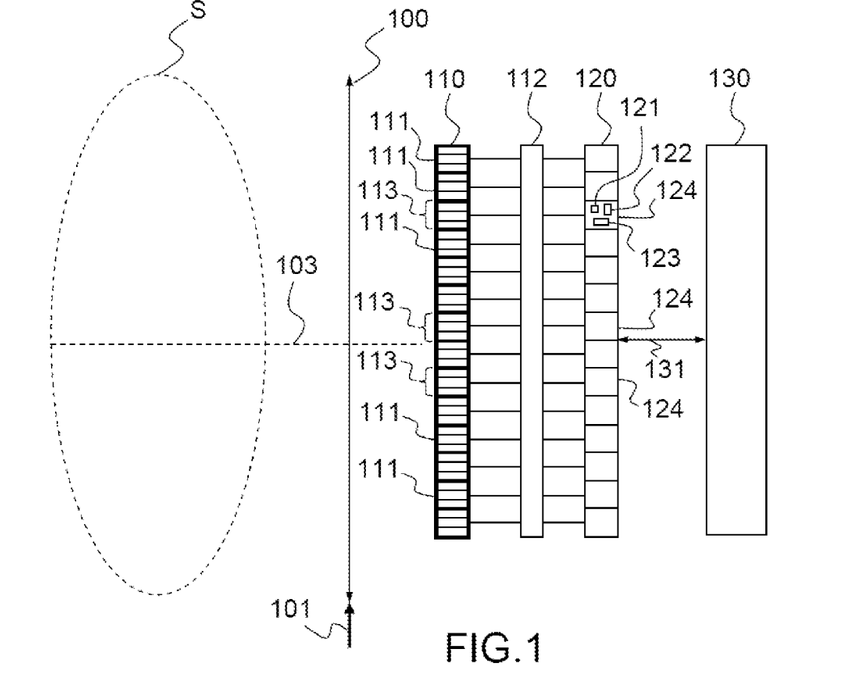
FIG. 1 describes the principle of the sensor according to the invention.

FIG. 1 shows the principle of the sensor according to the invention.

A deformable optical system 100, able to be deformed in the three spatial axes, forms an image of a three-dimensional scene S on an analog image sensor 110. The focal distance of the deformable optical system can be varied at a high rate, its value being controlled by means of a control signal 101. A plurality of planes or depths of the three-dimensional scene, corresponding to a plurality of focal distances fn, index n varying from 1 to n0, are thus successively imaged according to a plurality of images In on the sensor as a function of the control signal 101.

The analog image sensor carries out one image acquisition In for each value of focal distance Fn.

The successive images In are analyzed in order to determine depth information.

Advantageously, the optical axis 103 of the optical system 100 is also modifiable at a high rate as a function of the control signal.

The analog image sensor 110 is composed of elementary image elements or pixels 111. Each pixel or acquisition image element captures the optical information (data acquisition function) and transforms it into an electrical signal able to be read by means of circuits (data read function). The pixels 111 of the sensor are arranged as a matrix in rows and columns.

The pixels 111 of the sensor are grouped into sub-matrices 113 called macro-pixels. Each macro-pixel 113 is composed of a sub-assembly of pixels and operates independently of its neighbors for the acquisition and the reading of the data from the pixels that it comprises, and this is for each image processed. Each macro-pixel possesses its own addressing logic. With each macro-pixel is associated a portion of image corresponding to the portion of the image imaged on the macro-pixel.

The macro-pixels 113 are connected to a matrix 120 of elementary processors 124 via an interface 112. Each macro-pixel is directly connected via the interface 112 to a dedicated elementary processor in such a manner that the data relating to the pixels belonging to the macro-pixel are transmitted and processed by the processor to which the macro-pixel is connected.

Each elementary processor comprises a local memory 123, a neighborhood manager 121 and a plurality of local processing units 122, so as to carry out, for each of the pixels of the macro-pixel to which the processor is connected and for each portion of image, local processing operations referred to as of low-level operations, taking into account the neighboring pixels. When applied to a succession of images In, these local processing operations allow the depth information of the portion of image associated with the macro-pixel to be calculated. These processing operations are accelerated by running the calculation in parallel thanks to the plurality of elementary processors for each macro-pixel. The depth information is thus obtained for each macro-pixel, rather than for each pixel, which corresponds to a spatial under-sampling of the image sensor. By way of example, a macro-pixel can form a group of 16×16 pixels.

The depth information comprises a value of best sharpness for the corresponding macro-pixel and a value of the index n of the focal length fn for which the best value of sharpness of the corresponding macro-pixel is obtained.

The sharpness map corresponds to a table of data, each element of the table corresponding to a macro-pixel, the data value in the table being equal to the index n of the focal length fn for which the best value of sharpness for the corresponding macro-pixel is obtained.

The depth information can comprise a depth value. The depth is equal to the metric distance for which the corresponding macro-pixel is the sharpest (best sharpness).

The depth map corresponds to a table of data, each element of the table corresponding to a macro-pixel, the data value being equal to the depth value (metric distance) for which the corresponding macro-pixel is the sharpest (best sharpness).

The elementary processors operate in parallel and independently of one another in such a manner that, for each portion of image, the depth information is processed and calculated in parallel and independently over all of the macro-pixels of the image sensor.

In addition, each elementary processor is capable of modifying certain parameters of the image sensor corresponding to the associated macro-pixel.

The processors are designed to be connected to at least one processing unit 130. This unit carries out the processing operations referred to as high-level operations, corresponding to processing operations that use as input data high-level data obtained starting from the depth information calculated by the elementary processors 124.

The invention thus enables a highly-parallelized calculation of the depth information, allowing for example the depth map to be obtained in real time at a high rate.

The large bandwidth between the image acquisition elements (pixels) of a macro-pixel and the corresponding elementary processors (bandwidth increasing linearly with the number of pixels added to the acquisition assembly) enables acquisition and processing operations to be carried out at a high speed, for example of the order of 1000 acquisitions per macro-pixel per second or more. This processing speed, associated with a lens rapidly modifying its focal length, allows the various image samplings (for each macro-pixel) to be carried out rapidly, and hence a depth map to be obtained at the same speed as a standard video capture (30 or 60 times per second) while at the same time having a large number of portions of image or of sub-images (images per macro-pixel) needed for the algorithm for calculation of depth by sharpness.

By virtue of the direct communications between the image acquisition elements and the elementary processors, the communications bandwidth is independent of the number of pixels and this is in contrast to a conventional implementation where communications between the image sensors and the image processing units use a sequential scanning. The conventional implementation implies a limitation in the number of pixels that can be connected to the image processing units owing to the limited communications frequency.

On the other hand, it is not necessary to have an external image memory ("frame buffer") as in the conventional devices or for the sensor to write the values of pixels sequentially into memory in order for them to also be re-read sequentially by the image processing device.

The sensor according to the invention supports for example image resolutions of several million pixels (for example 8182×4096 in the "Super High Vision" format of NHK, Japan).

The independence of the elementary processors allows each elementary processor to be made capable of modifying certain parameters of the image sensor corresponding to the associated macro-pixel.

The instructions for modifications of the parameters are sent by the elementary processor to the pixels of the image sensor belonging to the corresponding macro-pixel via the interface 112, which is bidirectional.

Indeed, the interface 112 establishes a bidirectional connection between the macro-pixel and the corresponding microprocessor. The pixel data are sent by the image sensor to the microprocessor and the instructions for modification of the parameters are sent by the elementary microprocessor to the image sensor.

It is thus possible to carry out image pre-processing operations by locally modifying parameters of the image sensor for each macro-pixel. The image pre-processing is optimized prior to the calculation of the depth information. For example, a maximum value of the contrast is sought for each macro-pixel in order to obtain the best precision on the depth calculation.

For example, the acquisition time can be independently adjusted for each macro-pixel, and thus an optimal adjusted is made as a function of the average brightness of the macro-pixel: a weakly illuminated macro-pixel will have a longer acquisition time than a brightly illuminated macro-pixel in order to sense more photons.

According to another example, the gain of the acquisition chain of each macro-pixel may be adjusted as a function of the brightness: an image comprising dark and other brightly illuminated areas will thus have an optimal adjustment for each macro-pixel area, rather than an average adjustment over the whole image as with a system conventional.

Other processing image improvement operations may be carried out depending on the characteristics of the pixels composing the macro-pixel and thus independent pre-processing operations be carried out for each macro-pixel which allow the conditions under which the algorithm for depth detection is carried out to be improved.

The independence of the macro-pixels also allows the processing frequency, defined as the update frequency for the depth results, to be varied according to the macro-pixel. This variation allows the electrical consumption of the device to be reduced by means of various mechanisms such as:

switching off the power supply (or the clock) of the macro-pixels that have finished their calculations while waiting for all the macro-pixels to have finished their operations, varying the power supply voltage for the macro-pixels as a function of their frequency of operation (a lower frequency implies that a lower power supply voltage is possible, which in turn implies a lower power consumption because the power consumption is proportional to the frequency and to the square of the power supply voltage).

The processing frequency can vary as a function of the brightness and/or according to the movements and variations of the scene being observed. For example, a macro-pixel detecting a distant object can reduce its processing frequency since a distant object has little chance of rapidly coming very close (minimum rate of refreshment of the depth calculations is determined in such a manner that this is not the case).

Preferably, the deformable optical system 100 is not bulky, has a low power consumption and is able to respond at high speed to the control signal in such a manner as to obtain a sensor having the same advantages.

Advantageously, in order to obtain a compact sensor, the deformable optical system 100, the analog image sensor 110 and the processor matrix 120 are stacked on top of one another.

Advantageously the elementary processors are capable of communicating with their near neighbors (4 near neighbors or 8 near neighbors) so as to exchange depth information, for example by exchanging asynchronously their calculated depth value. As a variant, other characteristics such as the gradient of brightness may also be exchanged.

This information allows each macro-pixel to generate not only an average depth value, but also to send additional values to the interfaces with the other macro-pixels in order to produce a global map with a higher resolution (with more depth values) and to eliminate the errors due to the transitions between macro-pixels. For example, a macro-pixel can supply 5 or 9 different values: a central value, corresponding to the distance detected by the algorithm, but also the interface values allow a transition with the 4 or 8 depth values from the neighboring macro-pixels.

Another exemplary embodiment, requiring more calculations with more complexity, uses the values supplied by the neighboring macro-pixels in order to determine whether the macro-pixel "is" on an area that is uniform in depth, or on a transition area, and thus to provide results reflecting this situation.

Figure 2:
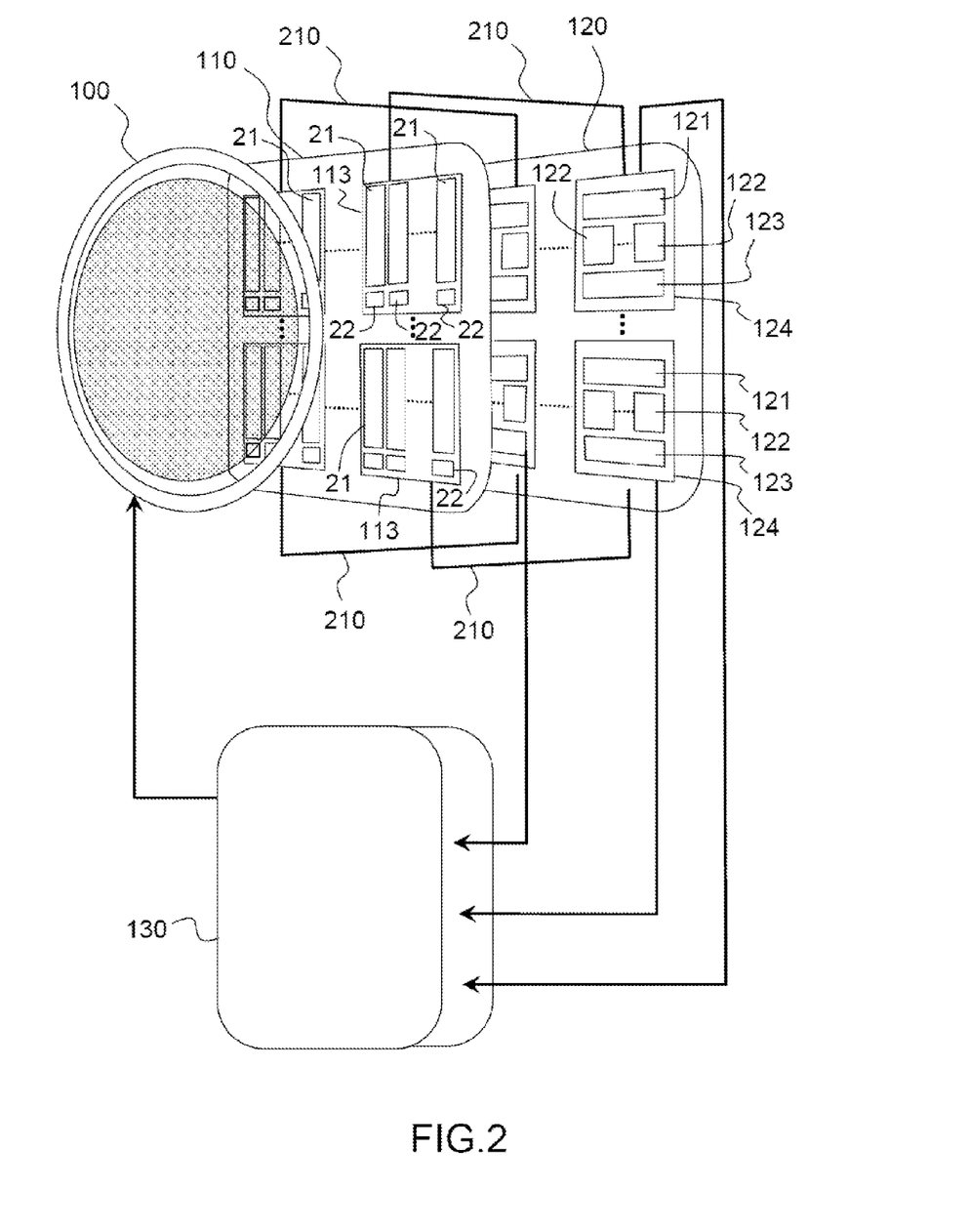
FIG. 2 describes a more detailed layout of the invention.

FIG. 2 describes a more detailed representation of the sensor according to the invention and one example of operation which advantageously optimizes the parallelism of the reading of the macro-pixel. In a macro-pixel, each pixel column 21 is connected to a circuit of the analog/digital converter type 22, well known to those skilled in the art, for reading the pixel data. Thus, all the columns of the macro-pixel are read in parallel, and the acquisition mode is for example of the "rolling shutter" type. The presence of a converter 22 at the end of each column of the macro-pixel allows one complete row to be read within one cycle time. With the example of a macro-pixel of 16×16 pixels, 16 cycles are therefore needed to read a macro-pixel with 16 rows.

In the case where there is one converter per macro-pixel, and no longer one converter per column, 256 cycles are needed to read all of the pixel data from the macro-pixel. The use of one converter per column therefore allows the reading of the data pixel to be accelerated.

The matrix of elementary processors is connected to the macro-pixels via interface means 112 consisting of a plurality of connections 210, each connection directly connecting a processor and a macro-pixel. For example, the connection is of "Through Silicon Via" type, using the acronym TSV.

Advantageously, the processor matrix has a high rate feedback action on the deformable optical system.

The elementary processor comprises a plurality of local processing units, connected in parallel, which is responsible for reconstructing the depth information.

Advantageously, owing to their proximity and to the direct access to the macro-pixel, the elementary processors are designed to carry out a closed-loop control on the macro-pixel in order to modify certain parameters of the image sensor, such as for example the integration time, which gives flexibility to the sensor.

Advantageously, the elementary processor calculates the sharpness of the macro-pixel corresponding to an image In. Advantageously, the sharpness is determined by summing, for all the pixels of the macro-pixel, the gradients (or Laplacian) associated with each pixel, by taking into account its neighbors thanks to the presence of a neighborhood manager 121, allowing a parallel access to the neighborhood of a given pixel and being able to perform convolution operations in one cycle.

The higher the value obtained, the better is the sharpness. The value k of the index n, corresponding to the focal distance Fk for which the sharpness is the best, is stored in the local memory 123. This local memory allows a recursive processing to be carried out as a function of the index n, by means of a calculation method of the "Shape From Focus" type using the acronym SFF.

The sharpness map corresponds to a table of data, each element of the table corresponding to one macro-pixel, the data value from the table being equal to the index n of the focal length fn for which the best value of sharpness of the corresponding macro-pixel is obtained. The dimensions of the local memory are according to the number of focal distances n0, corresponding to the number of depths for which the calculation of sharpness is performed. For example, for 1024 depth values, a local memory of 8 bits suffices. This is not an image memory, which is much larger. Indeed, owing to the direct access to the pixels of the sensor for each macro-pixel, the presence of a memory plane for storing the image with a view to processing it is no longer necessary, with the associated advantages in size and power consumption.

Moreover, this direct access, coupled with parallelism of the calculations and with the spatial proximity due to the stacking, drastically increases the processing bandwidth.

The local memory containing the depth information is continually updated, at each variation of focal distance fn corresponding to the acquisition of a new image In by the analog sensor 110. The depth information, for example the sharpness map, is thus obtained locally for each portion of image, without recourse to an image memory, at high rate, with real-time updating.

One example of an elementary processor is a processor of the "Simple Input Multiple Data" type using the acronym SIMD, comprising a local memory.

In one SIMD architecture, the basic processing elements simultaneously carry out the same instruction. This SIMD architecture is compatible with a low-level processing carried out in a macro-pixel. The matrix of elementary microprocessors can, in this case, be a two-dimensional matrix of SIMD processors.

However, the architecture provided is more flexible, because each elementary processor is independent allowing independent processing for each macro-pixel and is thus the free from the constraints of the SIMD for the overall architecture.

Advantageously, in order to obtain the depth map, a table of correspondence allows a depth value to be associated with each value of focal distance, enabling the generation of the depth map starting from the sharpness map, locally within the processor matrix. The table of correspondence may be located remotely in a shared memory or locally present in the form of a neighboring layer to the matrix of elementary processors and contributing to the stack.

Advantageously, the sharp image at all points is generated using the sharpness map and the corresponding value of the optimum sharpness, by means of a remotely located image memory. For example, if several objects of the scene being observed are detected at several depths, the sharp image at all points represents these various sharp objects transferred into a single plane.

A processing unit 130 performs the higher level processing operations, in other words the processing operations using as input data high-level data obtained starting from the raw pixel data directly produced by the image sensor. These input data may for example be the depth map. These high-level processing operations are for example of the shape recognition type, of the motion detection type, or of the "region of interest", using the acronym ROI, recognition type.

The processing unit 130 may be totally remote with respect to the processor matrix 120, or partially integrated in the form of a layer into the stack, which increases the compactness of the device.

Figure 3:
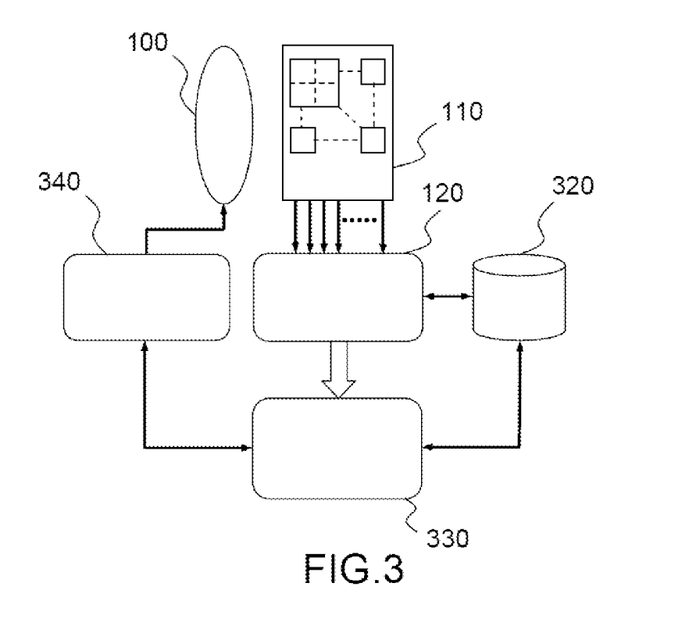
FIG. 3 describes one exemplary architecture of the sensor according to the invention.

FIG. 3 describes one example of an architecture for the sensor according to the invention, where the processing unit comprises an assembly of processors 330 of the multi-core type, with a higher granularity than the granularity of the matrix of elementary processors. The processors of the assembly 330 are more powerful but less numerous than the elementary processors. Advantageously, the high-level processing unit also comprises a shared memory 320, connected to both the matrix of elementary processors and to the assembly of multi-core processors. The shared memory has a size at least equal to the memory needed to store the data relating to one image.

Advantageously, the map of depth and/or the map of sharpness at all points is transmitted to the shared memory, itself connected to a display device capable of transforming the depth map into a three-dimensional image and/or capable of displaying a sharp image at all points. A capture system is formed from the sensor according to the invention and the display device.

Advantageously, the high-level processing unit is capable, depending on the characteristics extracted from the high-level processing operations, for example an analysis of the image, of feedback action at a high rate on the deformable optical system via the controller 340 so as to adapt itself to a given situation. The high-level processing operations correspond to the calculations performed based on the high-level input data, calculated starting from the pixel data.

The deformable optical system then becomes an active component in the high-level digital processing.

For example, the input data consist of the depth map or the sharp image at all points.

For example, following a shape recognition processing identifying a region of interest, the processing unit instructs the optical system to perform a zoom onto the region of interest. The three-dimensional processing is then specifically carried out on the region of interest in order to increase the spatial resolution.

According to another example, following the detection of a movement at the edge of the field or an analysis of the image, the processing unit instructs the optics to modify its optical axis 103 in such a manner as to image on the sensor a region initially out of the field. The three-dimensional processing is then carried out on this new region.

According to another example, feedback action onto the optical system allows a stabilization in order to improve the acquisition of images.

According to one preferred embodiment of the invention, the processing of the data is carried out in parallel at all the levels of the processing chain comprising the reading of the pixel data, the calculation of the depth information for each macro-pixel and the high-level processing operations:

each macro-pixel is read with the columns in parallel the calculation of the depth information is done in parallel in the macro-pixel by the presence of several elementary processors operating in parallel all the macro-pixels are read in parallel and independently the high-level processing unit is of the multi-core type.

With a high degree of parallelism, the sensor is able to generate a depth map at a high rate, for example 200 maps per second.

This parallelism is made possible by the formation of a stack of the various layers of the sensor: optics, image sensor, local calculation of the depth information.

According to one embodiment, at least a part of the high-level processing unit is also stacked behind the matrix of elementary processors, like the shared memory and the table of correspondence and/or the assembly of processors of the multi-core type.

The formation of a stack also allows a compact sensor to be obtained that is able to be installed onboard systems with constraints in terms of weight and of volume.

Advantageously the sensor comprises a component designed to communicate the depth information, such as the depth map coming from the local processing, to a remote system.

Figure 4:
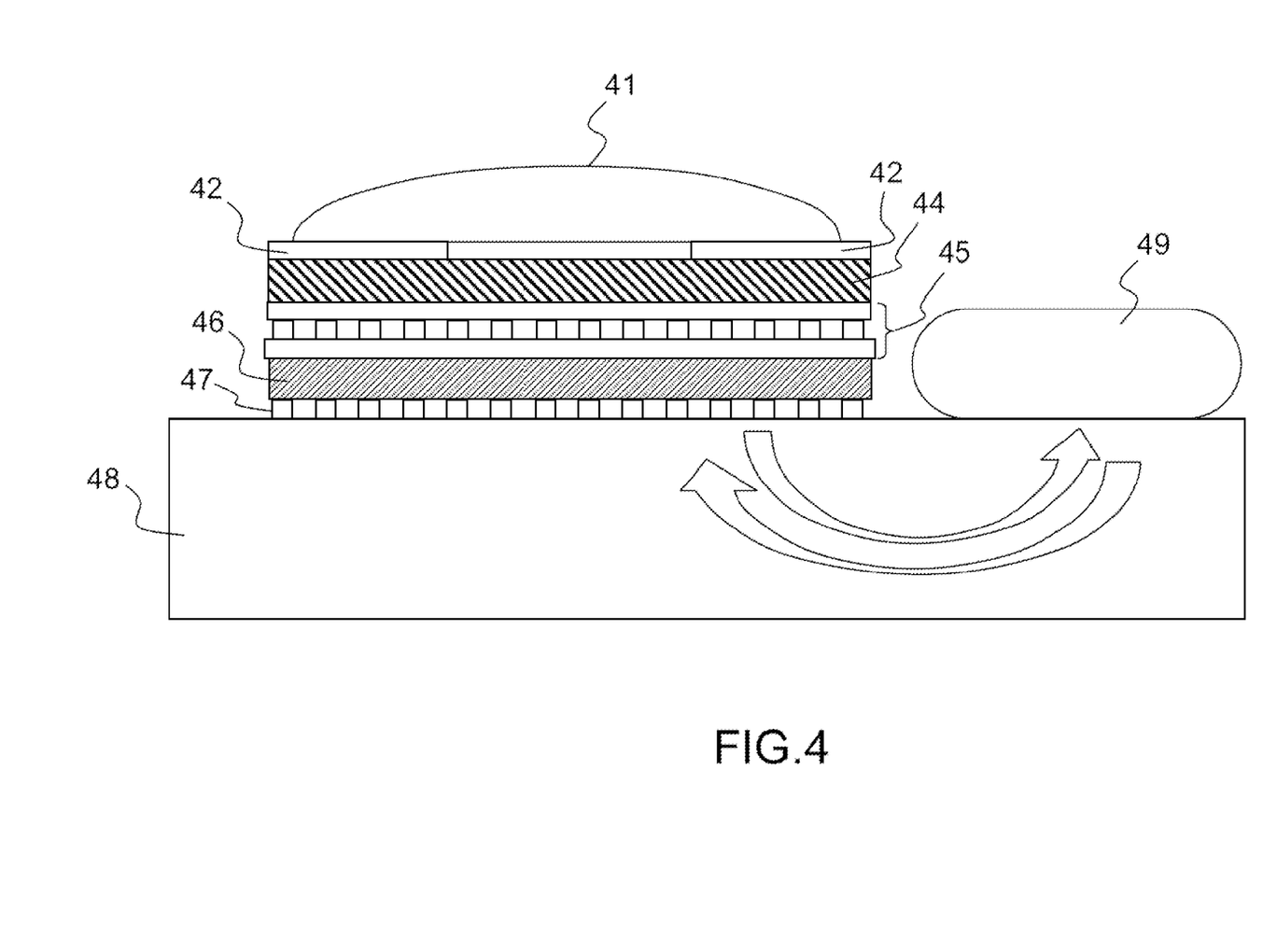
FIG. 4 describes one exemplary embodiment of the sensor according to the invention.

FIG. 4 describes one exemplary embodiment of the sensor according to the invention. The optics, the sensor and the matrix of elementary processors form a stack.

The control signal is applied to the deformable optical system 41 via electrodes 42. The image sensor 44 is connected to the processor matrix 46 by means of an interconnection 45 for 3D stacking, for example a TSV technique or a bonding technique (copper-copper for example), directly connecting each macro-pixel to a dedicated processor. The processor matrix is connected to a PCB 48, according to the acronym for "Printed circuit board", via a connection 47 for example of the BGA type. The PCB 48 may be replaced by a spacer, or by any other chip assembly technique.

The processing unit 49, remotely located with respect to the stack, consists for example of a FPGA, according to the acronym for "Field Programmable Gate array", connected to the PCB. Another example of a processing unit is a processor of the MPSoC type, according to the acronym for "Multi Processor System-on-a-Chip". The processing unit performs the high-level calculations, comprises a shared memory and the table of correspondence, and manages the communications protocol with the external central processing unit. These communications may be wired or wireless depending on the application.

Figure 5:
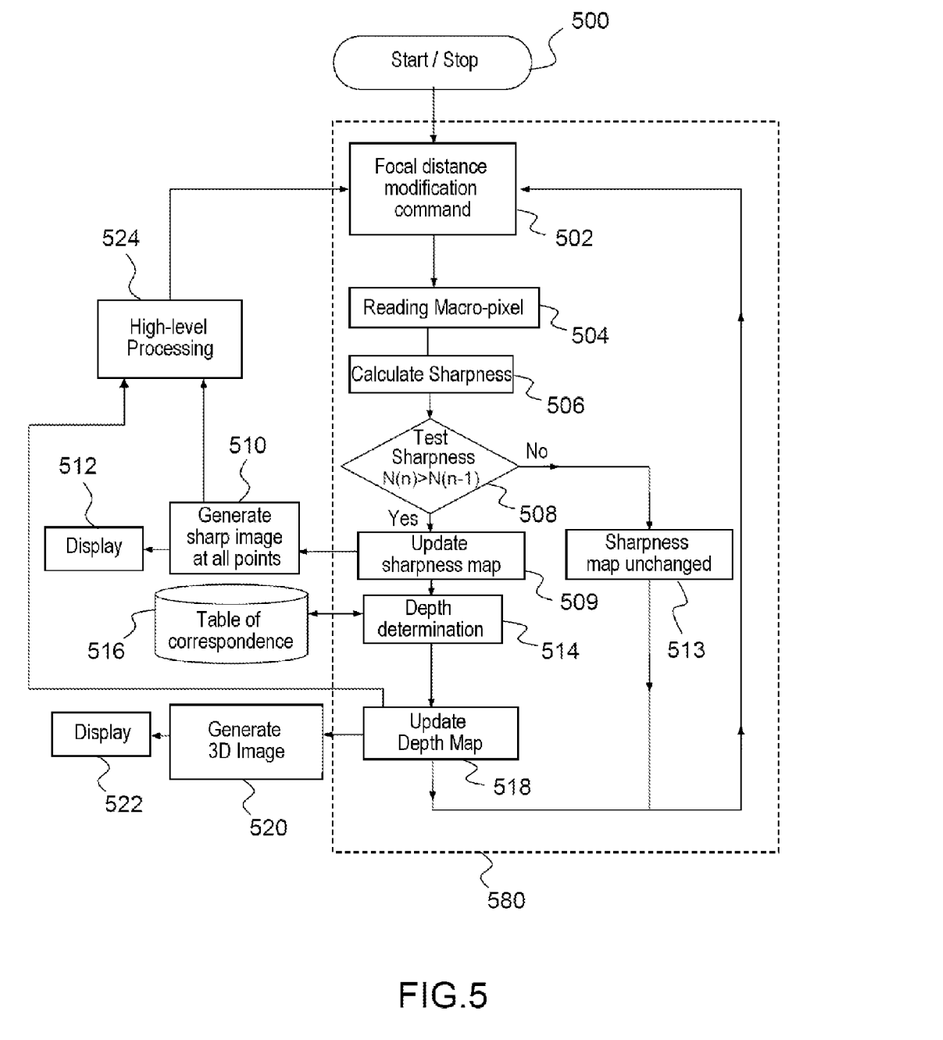
FIG. 5 describes the method for calculating the depth information according to the invention.

FIG. 5 describes the calculation method used for calculating and processing the depth information. The objective of this iterative calculation method is to seek, for each macro-pixel, the focal distance fk corresponding to the best sharpness of this macro-pixel.

The calculation method according to the invention is based on the SFF, acronym for "Shape From Focus", calculation method. However, the invention allows the sharpness and depth map to be updated at each iteration.

After starting up the system 500, in a first step 502, the deformable optical system receives a command for modifying the plane of the three-dimensional scene imaged by the deformable optical system, this plane corresponding to a focal distance F(n) (n index varying from 1 to n0). The image sensor receives the image I(n). Each pixel of the sensor delivers a signal proportional to the light received or pixel data value.

All of the steps that follow are carried out in parallel for all the macro-pixels of the sensor, and not necessarily in a synchronous manner over all the macro-pixels.

The step 504 performs the reading of the pixel data for all the pixels of the macro-pixel. The step 506 calculates the sharpness of each macro-pixel, by summing the gradient (or the Laplacian) of the pixel data from all the pixels of the macro-pixel. This calculation is carried out locally by the dedicated processor matrix. According to one variant not shown in FIG. 5, the processor matrix may, at this stage, apply a feedback action to the deformable optical system.

Then, a test 508 compares the sharpness value N(n) obtained with the value of focal distance F(n), with that previously obtained N(n−1) for the preceding focal distance Fn−1.

If N(n) is greater than N(n−1), (YES branch), the sharpness map is updated at the step 509. The value of the index n is stored in the sharpness map, in place of the previously stored value. The sharpness map consists of a table where all of the macro-pixels are indexed, and contains the index k corresponding to the focal distance Fk for which the best sharpness has been obtained.

The sharpness map is stored in memory and locally updated in the processor matrix.

Then, in a step 514, the depth value P(n) corresponding to the sharpness value N(n) is determined, by reading a table of correspondence 516, which associates with each value of focal distance, and hence of index n, a metric distance equal to the depth.

The depth map, composed of a table where all of the macro-pixels are indexed, and containing the depth value, is updated at the step 518. The depth map is stored in memory and locally updated in the processor matrix, Once the update has been applied, the calculation method returns to the step 502 where the deformable optical system receives a new command for modifying its focal distance to a value F(n+1). The sensor then receives an image I(n+1). The modification of the focal distance is synchronized with the image acquisitions by the sensor, which is carried out at a high rate.

During the test 508, if N(n) is less than N(n−1), (NO branch), no update of the sharpness map is applied, the preceding value (n−1) remaining stored in the sharpness map at the step 513. The depth map is not updated, the value P(n−1) remaining stored in the depth map. The method loops back to 502.

The sharpness map and the depth map are thus updated at the rate of image acquisitions, synchronized onto the change of focal distance of the deformable optical system.

According to the invention, at least all of the steps described previously, comprised in the block 580, are carried out locally by the processor matrix, and in parallel but independently for all the macro-pixels of the imager.

According to one option, once the sharpness map has been updated at the step 509, a step 510 consisting in storing in memory the calculated optimum value of sharpness, and optionally of high-level processing operations, allows the sharp image to be generated at all points. This storage in memory is carried out in a remote image memory.

This image can be displayed on a display device during the display step 512.

According to one option, the content of the depth map updated at the step 518, together with the information on the best sharpness for each macro-pixel, can be transferred, during a storage step 520, into a remote memory allowing access to the information in one block. In this same step, high-level processing operations may be carried out, for example in order to reproduce the texture. The result of this step is the generation of the three-dimensional image of the scene being observed, which can be displayed during a display step 522.

The high-level processing operations are carried out by the processing unit performing calculations using high-level input data. These high-level input data comprise the sharp image at all points and/or the depth map. Using this high-level input data, the processing unit carries out high-level processing operations during the step 524, such as for example shape recognition, search for a region of interest, motion detection, image analysis.

Consequent to the results of these processing operations, the processing unit is capable applying a feedback action to the deformable optical system, by looping back to the step 502, in such a manner as to modify the focal distance and/or of optical axis values, for which the whole of the iterative calculation for generation of the depth information is carried out.

Thus, the sensor according to the invention is very compact both in volume and in weight, has a low power consumption, does not require any image memory and allows a sharpness map (or depth map) to be obtained in real time and at a high rate. These performance characteristics are made possible by virtue of a parallel and local processing of the data, by means of an optimized stack.

The invention claimed is:

1. A three-dimensional scene sensor comprising:
a deformable optical system allowing a modification of a focal distance as a function of a control signal,
said optical system imaging said scene on an analog image sensor for a plurality of depths corresponding to a plurality of values of focal distance,
said analog image sensor carrying out one image acquisition for each value of focal distance,
the images being analyzed in order to determine depth information,
said analog image sensor comprising a matrix of pixels, said pixels being grouped into sub-matrices called macro-pixels composed of a sub-assembly of pixels, each macro-pixel operating independently of its neighbors for the acquisition and a reading of data from said pixels for each portion of image, one portion of image being respectively associated with one macro-pixel,
a matrix of elementary processors, each macro-pixel being directly connected via an interface to a dedicated elementary processor in such a manner that the pixel data relating to said pixels belonging to said macro-pixel are transmitted and processed by said processor,
each of said elementary processors comprising a local memory, a neighborhood manager and a plurality of local processing units in such a manner as to carry out, for each of the pixels of the macro-pixel to which said processor is connected and for each portion of image, local processing operations taking into account the neighboring pixels, said local processing operations allowing depth information to be calculated for said macro-pixel,
said processors operating in parallel and independently of one another such that for each portion of image the depth information is processed and calculated in parallel and independently over all of the macro-pixels of said image sensor,
each elementary processor being capable of modifying certain parameters of the image sensor corresponding to the associated macro pixel,
said processors being designed to be connected to at least one processing unit allowing calculations to be carried out using high-level input data, obtained starting from depth information calculated by said elementary processors.

2. The sensor as claimed in claim 1 wherein said deformable optical system, said image sensor and said processor matrix form a stack.

3. The sensor as claimed in claim 1 wherein said deformable optical system allows a modification of its optical axis as a function of the control signal.

4. The sensor as claimed in claim 1 wherein the elementary processors are designed to communicate with their near neighbors so as to exchange depth information.

5. The sensor as claimed in claim 1 each wherein macro-pixel comprises a plurality of columns of pixels, each column being connected to a circuit of analog/digital converter type for reading the pixel data of each said column.

6. The sensor as claimed in claim 1 wherein said local memory of a macro-pixel contains the depth information updated at each new acquisition by said sensor of an image portion.

7. The sensor as claimed in claim 6 wherein depth information stored in said local memory comprises a value of best sharpness for a corresponding macro-pixel and a value of an index of a focal length for which the best value of sharpness of the corresponding macro-pixel is obtained.

8. The sensor as claimed in claim 7 wherein said depth information stored in said local memory comprises a depth value.

9. The sensor as claimed in claim 1 wherein the processing unit furthermore comprises a shared memory connected to both the matrix of elementary processors and to an assembly of multi-core processors.

10. The sensor as claimed in claim 1 wherein said high-level input data comprise a depth map.

11. The sensor as claimed in claim 1 wherein said high-level input data comprise a sharp image at all points.

12. The sensor as claimed in claim 1 wherein the processing unit is capable of a feedback action on said deformable optical system as a function of a result of said calculations performed by said processing unit.

13. The sensor as claimed in claim 1 further comprising a component designed to communicate the depth information to a remote system.

14. The sensor as claimed in claim 1 wherein the depth information is obtained by means of an iterative calculation method based on a determination of the focal distance of said deformable optical system allowing the best sharpness to be obtained, said calculation method being carried out locally within said processor matrix and in parallel for each macro-pixel within said processor matrix.

15. The sensor as claimed in claim 14 wherein said calculation method is carried out locally within said processor matrix.

16. The sensor as claimed in claim 14 wherein said calculation method allows an update at each iteration of the depth information.

17. A system for capturing a three-dimensional scene comprising at least one sensor as claimed in claim 1 and furthermore comprising a display device capable of displaying a three-dimensional image of the captured scene.

* * * * *